Jan. 29, 1929.
C. SATTLER ET AL
1,700,238
WINDOW STRUCTURE
Filed July 5, 1927
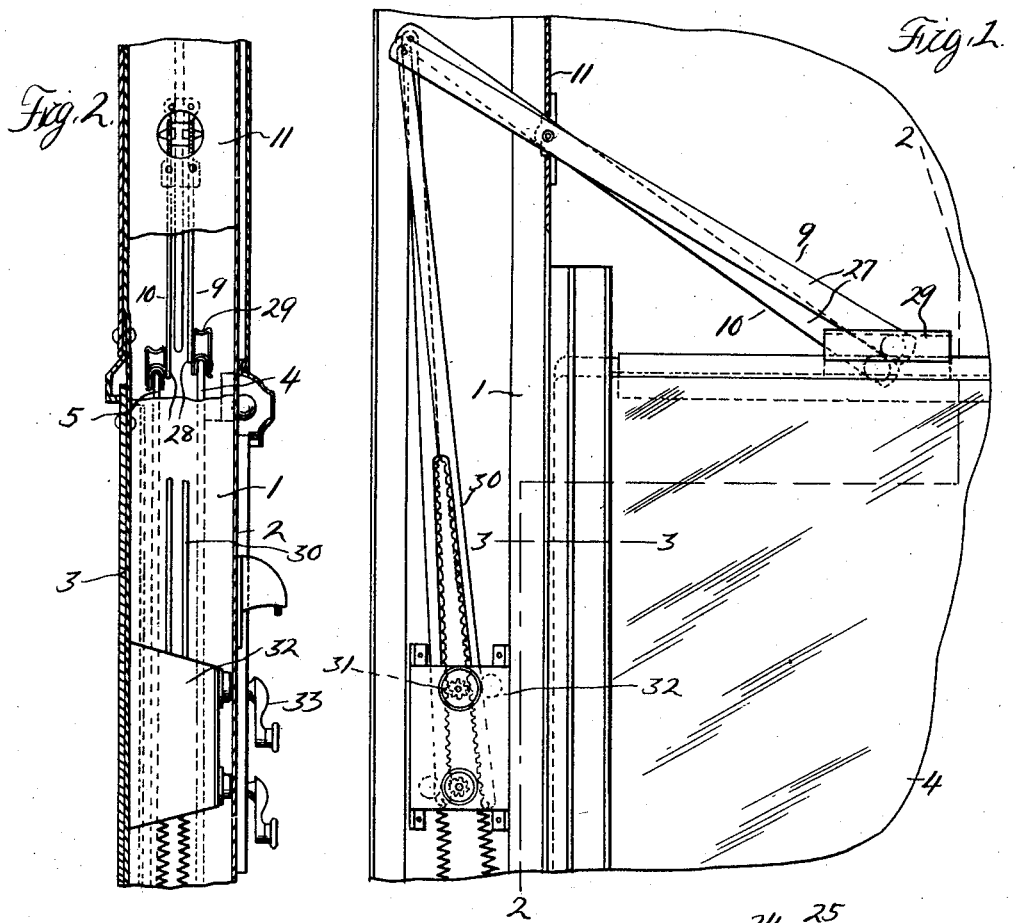
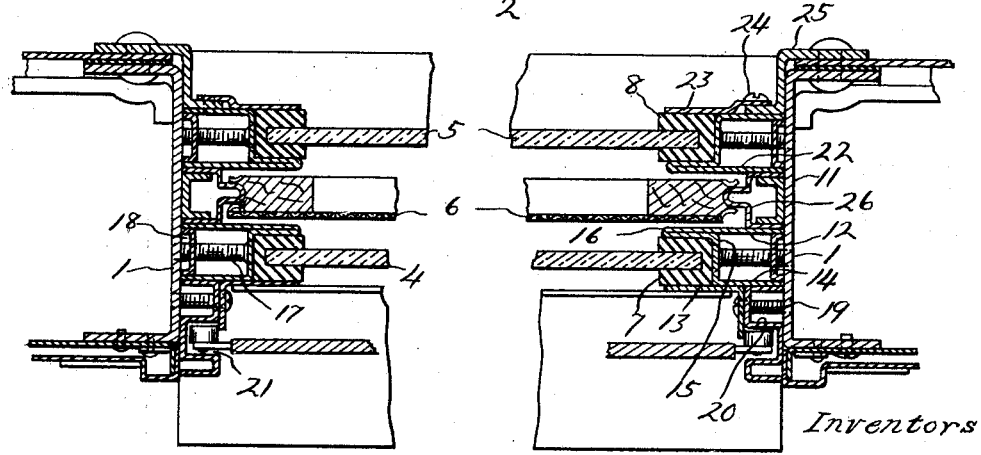
Inventors
Carl Sattler
Howard B. Haskins Patented Jan. 29, 1929.

1,700,238

UNITED STATES PATENT OFFICE.

CARL SATTLER AND HOWARD B. HASKINS, OF TOLEDO, OHIO, ASSIGNORS, BY MESNE ASSIGNMENTS, TO THE DURA COMPANY, OF TOLEDO, OHIO, A CORPORATION OF OHIO.

WINDOW STRUCTURE.

Application filed July 5, 1927. Serial No. 203,361.

The invention relates to window structures and refers more particularly to window structures for railway cars. One of the objects of the invention is to so construct a window structure for windows of the sashless type that the structure may be readily applied to a railway car without changing its construction. Another object is to so construct the window structure that both the inner and outer windows may be raised and lowered by window reguators and may be readily removed. Further objects of the invention reside in the novel features of construction and combinations and arrangements of parts as more fully hereinafter set forth.

In the drawings:—

Figure 1 is an interior side elevation, partly broken away, of a portion of a railway car having applied thereto a window structure embodying our invention;

Figures 2 and 3 are cross sections, respectively, on the lines 2—2 and 3—3 of Figure 1.

The railway car for which our window structure is particularly designed is a Pullman car having the metallic channel-shaped uprights 1 opening away from each other and forming the sides of window openings. 2 and 3 are respectively, the outer and inner panels of the car which, with the uprights, form chambers above the window openings for receiving the windows when raised and also form vertical chambers at the sides of the openings.

4 and 5 are respectively the inner and outer windows of the sashless type and in the nature of glass panes. To mount these windows without changing the construction of the car and at the same time to mount the screen 6, which is of the usual construction and is located between the windows, we have devised the following arrangement. 7 and 8 are guides respectively, for the inner and outer windows, these guides being formed of fibrous material and having longitudinally extending grooves for engaging the edges of the windows and permitting the raising and lowering thereof by the window regulators 9 and 10, respectively. Since the arrangement of the guides 7 and 8 at both edges of the window is the same, that at one edge will be described. The inner guide 7 is secured in fixed relation to the web 11 of the upright 1 by means of the sheet metal tubular retainer 12 and the sheet metal L-shaped retainer 13. The tubular retainer 12 has the inner and outer legs 14, the transverse wall 15 and the flange 16, which latter is formed in part by an extension of the outer leg 14. The tubular retainer is secured to the web 11 of the upright by suitable means such as the screws 17 which extend through the transverse wall and also through the web of the sheet metal channel-shaped spacer 18 located between the legs of the tubular retainer. One flange of the L-shaped retainer 13 extends at the inner side of the inner leg of the tubular retainer and together with the flange 16 of the tubular retainer embraces the guide, which is held by the window against the transverse wall 15 of the tubular retainer. The other flange of the L-shaped retainer is secured by suitable means such as the screws 19 to the web 11 of the upright and this flange is clamped against the sheet metal U-shaped guide 20 and also holds this guide against the web of the upright. This guide provides the longitudinally extending groove 21 for guiding the curtain for the window and the flange of the L-shaped retainer which is secured against the guide extends inwardly over the groove to retain the carriage at the lower end of the side of the curtain in the groove. The outer guide 8 is secured in fixed relation to the web 11 of the upright by means of the sheet metal tubular retainer 22 and the sheet metal retainer 23. The tubular retainer 22 is formed in the same manner as the tubular retainer 12 and is secured to the web of the upright also in the same manner, with the exception that the flange of the tubular retainer 22 is located at the inner side of the guide 8. The sheet metal retainer 23 is secured against the outer side of this guide by suitable means such as the screws 24 which are threaded into the bracket 25, the latter being rigidly secured to the outer side of the car. The screen 6 is guided by the sheet metal guide 26, which is located between the tubular retainers 12 and 22.

With this arrangement, it will be seen that the sashless windows 4 and 5 are so mounted that they may be raised and lowered and the mounting is such that the standard construction of car may be used. It will also be seen that the mounting provides for readily removing either or both the inner and outer windows, the former being removable in an inward direction upon removal of the L-shaped retainer 13 and the latter being removable in an outward direction upon removal of the retainer 23. It will furthermore be seen that the L-shaped retainer 13, in addition to assisting in retaining the inner guide 7 in place functions to hold the window curtain in its guide groove.

Each window regulator 10 is so constructed that its window may be readily disengaged therefrom when it is desired to remove the window. As shown, each window regulator has the lifter arm 27, which extends within the chamber above the window opening and through the web 11 of one of the uprights 1. The end of this arm located within the chamber above the opening is provided with the transverse projection 28 which engages in the sheet metal retainer 29, which latter is secured to the upper edge of the window. This retainer is of a length that the window is operatively connected to the lifter arm between the limits of normal travel of the window, but permits disengagement of the window from the lifter arm upon abnormal movement of the window. For operating the lifter arm, which is pivoted in substantially the plane of the web 11 of the upright, there is the rack 30 which is pivotally connected to the lifter arm within the vertical chamber at the side of the window opening and the pinion 31, which meshes with the rack 30, this pinion being driven through suitable irreversible drive mechanism located within the cup 32 by the handle 33 at the side of the window opening.

From the above description it will be seen that we have provided for mounting windows of the sashless type in a railway car so that they may be readily operated by window regulators. It will also be seen that the mounting is such that the standard construction of car may be used and that either of the windows may be removed independently of the other.

What we claim as our invention is:

1. The combination with a railway car having laterally spaced standard uprights forming an opening, of sashless windows for the opening, and means within the opening and mounted upon said uprights for guiding said windows and provided for the removal of either independently of the other.

2. The combination with a railway car having laterally spaced standard uprights forming an opening, and a screen for the opening guided upon said uprights, of a pair of sashless windows for the opening at the inner and outer sides of said screen, and a mounting for said windows upon said uprights including removable members providing for the removal of the inner window in an inward direction and the removal of the outer window in an outward direction.

3. The combination with a railway car having laterally spaced uprights forming an opening, of a sashless window, guides for said window, and means upon said uprights for holding said guides in position, said means extending within the opening at the inner sides of said uprights and including a member secured to an upright and having an L-shaped portion engaging a side and an edge of a guide, and a second member secured in fixed relation to said first-mentioned member and having a portion engaging an opposite side of said guide.

4. The combination with a railway car having laterally spaced uprights forming an opening, of a sashless window, guides for said window, and means upon said uprights for holding said guides in position, said means extending within the opening at the inner sides of said uprights and including a tubular retainer secured to an upright and having a transverse wall and a flange for respectively engaging an edge and a side of a guide, and an L-shaped retainer adjacent said first-mentioned retainer and having a flange engaging an opposite side of said guide.

5. The combination with a railway car having laterally spaced uprights forming an opening, of a sashless window, guides for said window, tubular retainers secured to said uprights and having L-shaped portions for engaging a side and an edge of said guides, U-shaped guides adjacent said tubular retainers and providing grooves for guiding the window curtain, and L-shaped retainers each having a flange engaging the opposite side of said window guide and a flange extending over the groove of a U-shaped guide for holding the window curtain from disengagement from said U-shaped guide.

6. The combination with a railway car having laterally spaced uprights forming an opening, of a sashless window, guides for said window, tubular retainers secured to said uprights and having L-shaped portions for engaging a side and an edge of said guides, U-shaped guides adjacent said tubular retainers and providing grooves for guiding the window curtain, L-shaped retainers each having a flange extending over the groove of a U-shaped guide for holding the window curtain from disengagement from said U-shaped guide, and common means for securing the adjacent U-shaped guides and L-shaped retainers to the adjacent uprights.

In testimony whereof we affix our signatures.

CARL SATTLER.
HOWARD B. HASKINS.